United States Patent [19]

Beyer

[11] Patent Number: 4,689,851
[45] Date of Patent: Sep. 1, 1987

[54] ELASTIC HINGE FOR EYEGLASSES

[75] Inventor: Karl Beyer, Meyrin, Switzerland

[73] Assignee: LN Industries SA, Geneva, Switzerland

[21] Appl. No.: 840,039

[22] Filed: Mar. 17, 1986

[30] Foreign Application Priority Data

May 1, 1985 [CH] Switzerland .................. 01842/85

[51] Int. Cl.$^4$ ............................................. G02C 5/22
[52] U.S. Cl. .................................. 16/228; 351/113; 351/141
[58] Field of Search ............... 16/228, 286, 296, 304, 16/254, 255; 351/113, 116, 141, 153

[56] References Cited

U.S. PATENT DOCUMENTS 2,578,797 12/1951 Gordinier .................. 16/225
4,005,930 2/1977 Guenin ...................... 16/228
4,351,086 9/1982 Drlik ........................ 16/228
4,494,834 1/1985 Tabacchi .................. 16/228 X Primary Examiner—E. R. Kazenske
Assistant Examiner—James L. Wolfe
Attorney, Agent, or Firm—Anthony A. O'Brien

[57] ABSTRACT

The elastic hinge comprises a box (9) solid with the temple (1) of the eyeglasses, this box containing a part (8) carrying a knuckle (6) and sliding in the box (9) against the action of a spring (11). This spring receives stationary support against a part (12) which is made solid with the box (9) by a ball (14) engaged in a hole (15) of this ball and in a recess (16) of the box. The ball is held in position by a screw (17) which is accessible only in the folded position of the temple.

5 Claims, 4 Drawing Figures

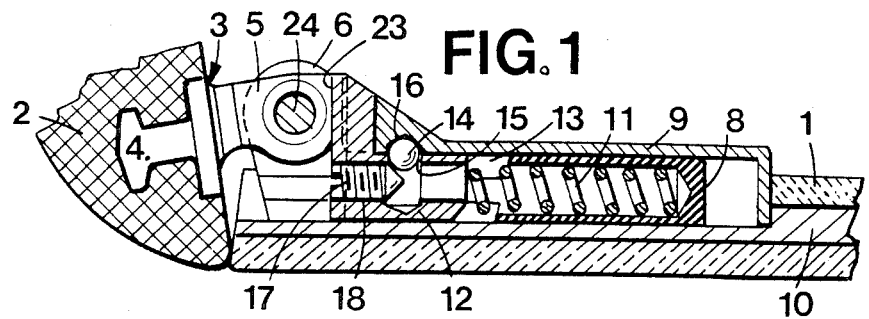
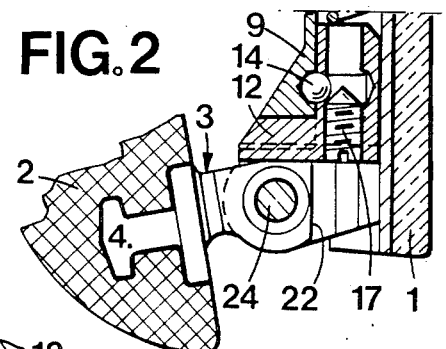
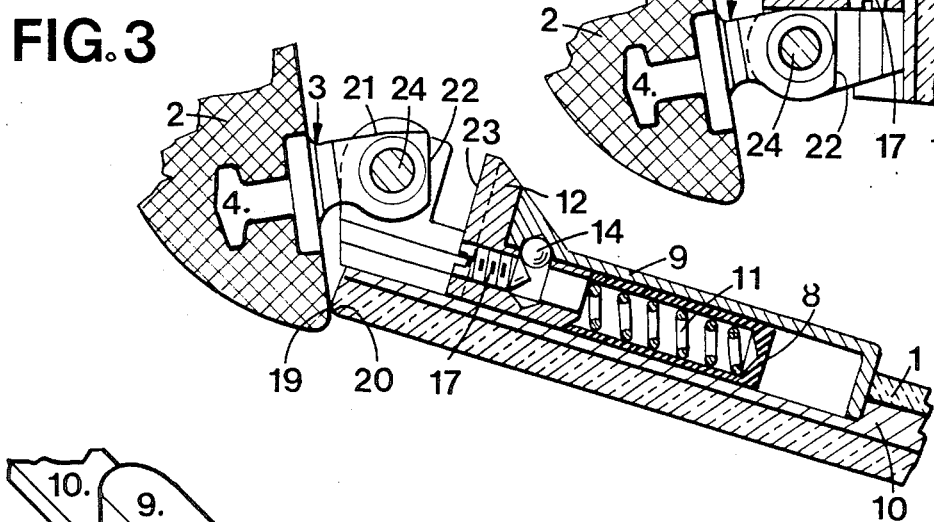
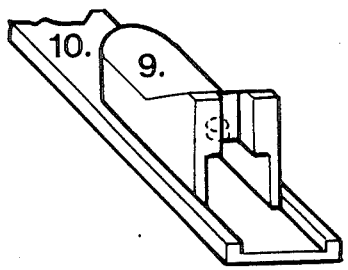
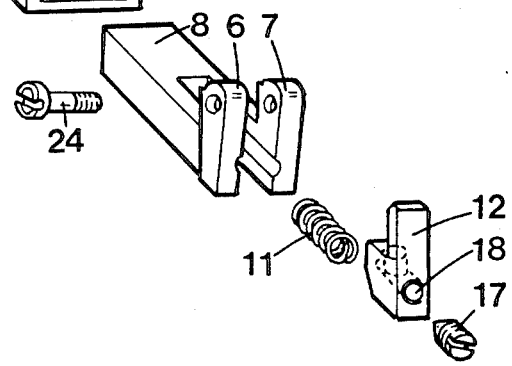

ELASTIC HINGE FOR EYEGLASSES

Elastic hinges for eyeglasses are already known comprising two parts articulated to one another, one of these parts being mounted to slide in a housing of an elongated box intended to be fastened to the front end of a temple, this sliding part being subjected to the action of a return spring, held in said housing by a closing part partially engaged in this housing, locking means of the closing part being provided to make this latter stationary in relation to the box.

Hinges of this type are described, for example, in German patent application No. 32 13 174 and German Pat. No. 29 40 055.

In these known hinges, the locking means of the closing part consist of a mobile part which is to engage in a cavity under the effect of gravity, while the return spring is held by external means in a position where it is slightly compressed. These hinges require good dexterity of the assembly worker.

This invention has as its object facilitating the placing and removal of the closing part of the hinge.

The hinge according to the invention is characterized in that the closing part exhibits a tapped hole, oriented longitudinally in relation to the sliding part, this hole being intended to receive a screw acting on the locking means, the head of this screw being accessible in the folded position of the temple.

The accompanying drawing shows diagrammatically by way of example an embodiment of the hinge that is the object of the invention.

FIG. 1 is a section of this hinge in unfolded position of the temple.

FIG. 2 is a corresponding section showing the folded position.

FIG. 3 is a corresponding section showing unfolding of the temple beyond its normal position.

FIG. 4 is an exploded view of the various parts constituting the elastic part.

With reference to FIGS. 1 to 3, the hinge is mounted on the eyeglasses to connect a temple 1 to front face 2 of the frame of the eyeglasses. This hinge comprises a first part 3 of which a portion is buried in plastic forming front face 2. This part 3 exhibits a male knuckle 5 around which two female knuckles 6 and 7 (FIG. 4) of the other part of the hinge pivot thanks to a pivot pin 24.

As FIG. 4 shows, knuckles 6 and 7 are made in one piece with sliding part 8 intended to be introduced into a corresponding recess of a box 9 which is fastened, for example by welding, to the end of a metal reinforcement 10 of temple 1. Part 8 is pulled toward the bottom of box 9 by a spring 11 which rests against a closing part 12, which is locked in position in relation to box 9 thanks to locking means.

Closing part 12 partially penetrates into a housing 13 defined by box 9 and the end of reinforcement 10. The locking means consist of a ball 14 that engages in a side opening 15 of the closing part and in a recess 16 made in the inside wall of box 9. This ball 14 is held in its locking position by a screw 17 introduced into a tapped hole 18 of closing part 12.

As FIGS. 1 and 2 show, the slotted head of screw 17 cannot be seen when temple 1 is unfolded but becomes accessible when the temple is folded, as shown in FIG. 2.

During assembly, it can be seen that sliding part 8 and spring 11 can be introduced into box 9, which, of course, has already been welded onto reinforcement 10. Then closing part 12 is introduced, then ball 14 followed by screw 17. When the latter is screwed into the tapped hole, its tapered end shoves the ball sideways and makes it penetrate into side opening 15 until it comes to strike against the bottom of blind hole 16. Part 12 is then made firmly solid with box 9.

As FIG. 3 shows, this arrangement makes it possible to obtain an elastic opening of the temple beyond its normal opening position. In this case, the end of the temple comes to strike at 19 by its tip 20 against the front part of the eyeglasses, and sliding part 8 carrying knuckles 6 and 7 is pulled toward the outside of box 9 against the action of spring 11.

It should be noted that male knuckle 5 exhibits a cam profile formed by two flat parts 21 and 22 with which a plane surface 23 of closing part 12 comes to engage to define the folded and/or normal use positions of the temple.

It is, of course, possible to provide numerous variant embodiments and in particular ball 14 could be replaced by another element making possible the locking of closing part 12 on box 9. For this purpose, closing part 12 could be slotted and its inside end could exhibit a tapered hole in which the end of a screw would engage to cause its radial expansion and thus obtain a locking of this part in box 9.

I claim:

1. Elastic hinge for eyeglasses comprising two parts (3 and 8) articulated to one another between open and folded positions, an elongated box (9) defining a housing (13) and adapted to be fixed to an eyeglass temple (1),
   one (8) of said parts (3 and 8) slidably disposed in said housing (13),
   a return spring (11) biasing said sliding part (8),
   a closing part (12) extending partially into said housing (13) and holding said return spring (11) in said housing (13),
   locking means (14) fixing said closing part (12) in relation to said box (9),
   characterizied in that said closing part (12) includes a tapped hole (18) oriented longitudinally in relation to said sliding part (8), a screw (17) disposed in said tapped hole (18) and acting on said locking means (14), said screw (17) having a head accessible in the folded position of said temple (1).

2. Hinge according to claim 1, wherein the locking means consist of a movable element placed in a hole of the closing part, this element being made to be moved radially by said screw to engage in a side opening of the closing part at the same time as in a recess made in the box.

3. Hinge according to claim 2, wherein the locking element consists of a ball, the end of the screw engaging with this ball being tapered.

4. Hinge according to claim 1, wherein the closing part exhibits a support surface intended to engage a knuckle of the other part of the hinge, this knuckle exhibiting a cam profile defining, by its engagement with the closing part, a normal open position of the temple and a folded position of the temple.

5. Hinge according to claim 4, wherein the support surface of the closing part is plane, the cam profile of said knuckle being made up of two flat parts provided on the edge of said knuckle.

* * * * *